| R | .6 | .8 | 1.0 | 1.2 | 1.4 | 1.5 | 1.6 | 1.8 | 2.0 |
|---|---|---|---|---|---|---|---|---|---|
| $Y_1$ | 12.5 | 5.6 | 0.0 | -4.5 | -8.3 | -10.0 | -11.5 | -14.3 | -16.7 |
| $Y_2$ | 12.6 | 5.5 | 0.0 | -4.5 | -8.2 | -10.0 | -11.6 | -14.4 | -17.1 |

Inventor
Herbert Ziebolz and
Hubert J. Velten

By A. D. Adams
Attorney

Inventor
Herbert Ziebolz and
Hubert J. Velten

Nov. 19, 1940.   H. ZIEBOLZ ET AL   2,222,551
RATIO VARYING DEVICE
Filed Oct. 29, 1936   3 Sheets-Sheet 3

Inventor
Herbert Ziebolz and
Hubert J. Velten

By A. D. Adams
Attorney

Patented Nov. 19, 1940

2,222,551

UNITED STATES PATENT OFFICE 2,222,551

RATIO VARYING DEVICE

Herbert Ziebolz and Hubert J. Velten, Chicago, Ill., assignors to Askania Regulator Company, Chicago, Ill., a corporation of Illinois Application October 29, 1936, Serial No. 108,298

6 Claims. (Cl. 74—1)

This invention relates to improvements in mechanism for varying the magnitude of movements and/or forces, more particularly for use in controlling or measuring devices. More specifically the invention relates to improved apparatus for measuring and/or controlling physical conditions.

The invention aims to provide a novel, simple and reliable mechanism for varying the magnitude of movements and/or forces in accordance to the product of a plurality of factors, hereinafter referred to as "correction factors."

Other aims and advantages of this invention will appear in the following description, considered in connection with the accompanying drawings wherein.

Figure 1:
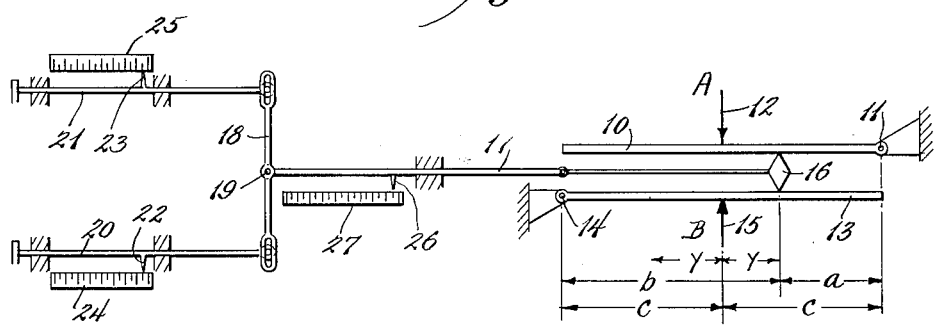
Figure 1 is a diagrammatic illustration of one form of mechanism for practicing the invention.

Referring to Figure 1, showing diagrammatically one form of the invention, a lever 10, pivotally mounted at 11, is acted upon by a force A indicated by an arrow 12. A second lever 13 pivotally mounted at 14 extends substantially parallel to the first lever 10 and is acted upon by a force B, acting in opposition to the force A. The force B is indicated by an arrow 15. A connecting member or ratio slider shown as having the form of a prism 16 secured to a rod 17 is interposed between the levers 10 and 13 to transmit forces or movements from one to the other. The ratio of the forces A and B may be varied by moving the rod 17 in axial direction. The rod and prism effecting the change of leverage will be called in the following "ratio slider."

The mechanism, so far as described, is known in the art, and used, for example, to transmit controlling impulses, such as forces or movements, to measuring apparatus relays and the like. In that particular application the controlling impulse may be applied at A and the measuring apparatus, or relay, be operated by the second lever 13, for example, by connecting it to the same at B. By means of the ratio slider it is therefore possible to vary the magnitude of an impulse A with regard to an apparatus connected to the impulse transmitting lever 13 at B by varying the leverage of the mechanism. A displacement of the ratio slider, in effect, multiplies the impulse A with a "correction factor."

For many purposes, however, the introduction of only one correction factor is insufficient. The present invention permits the introduction of the product of a plurality of correction factors and is based on a discovery which will now be described.

The characteristic of the mechanism can be mathematically expressed as follows:

(A) $$R = \frac{c-y}{c+y}$$

where:

R—Ratio of the forces or lever arms $$R = \frac{A}{B} = \frac{a}{b}$$

c—Distance of the points of application of the forces A and B from the pivot points;
y—Displacement of the ratio slider, positive to the right, negative to the left.

The Equation (A) can be transformed to read in terms of $y$, as follows:

(B) $$c - y = cR + Ry$$

(C) $$Ry + y = c - cR$$

(D) $$y(R+1) = c(1-R)$$

(E) $$y = c\frac{1-R}{1+R}$$

It was found that for values of R ranging between about .5 and 2.0 the Equation (E) may be substituted with close approximation by the following equation:

(F) $$y = K \log R;$$

where:

K—an arbitrary constant depending upon the constructional design of the mechanism.

Figure 2:
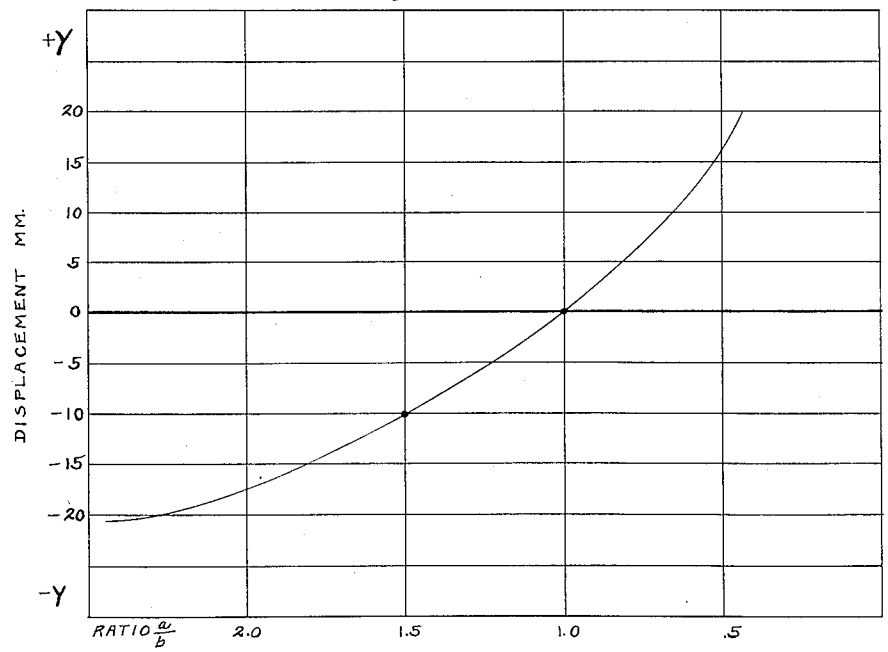
Figure 2 is a table and chart illustrating the mechanical operation of the mechanism shown in Figure 1.

To illustrate the foregoing a displacement-versus-ratio curve is shown in Figure 2. For this specific example a value of $c=50$ millimeters is assumed, and the displacement values determined for different R values by substitution in Equation (E) which, in this specific example, assumes the form:

(G) $$y^1 = 50\frac{1-R}{1+R}$$

A second series of displacement values $y_2$ appears in the table in Figure 2 based on the Equation (F) which in this specific example assumes the form:

(H) $\quad y_2 = -56.78 \ (\log R)$

The constant K=56.78 is determined as follows: The Equation (F) comprises a family of logarithmic curves, all of which go through the point $R=1$; $y=0$. From this family one curve is selected which has at least two points in common with the $y_1$-curve. In this case the point $R=1.5$; $y_1=10$ of the $y_1$-curve was taken to determine the constant in the equation of the $y_2$-curve. From (F) follows:

(J) $\quad K = \dfrac{y}{\log R}$ (K) $\quad K = \dfrac{10}{\log 1.5} = 56.78$

From the above Equation (H) the values of $y_2$ for the values of R in the table are calculated and are entered under $y_1$ values. A comparison of the $y_1$ values with the $y_2$ values in the table shows that within the above-mentioned range the Equation (F) can be substituted with close approximation for Equation (E).

If now for example the known arrangement is to be employed for mechanical multiplication, then in a simple case $$R = p \cdot q$$

where $p$ and $q$ are two factors to be multiplied. Now $$\log R = \log p + \log q$$

and consequently from Equation (F)

$$y = K \ (\log p + \log q)$$

Therefore, the displacement $y$ of the slider 16 is equal to the sum of the logarithms of the two factors to be multiplied. It follows that the transmission ratio varies with the product of those factors the logarithms of which are algebraically applied to the slider 16. If the logarithms of the two factors to be multiplied are summed geometrically then the transmission ratio gives the product, if they are subtracted geometrically, then the transmission ratio gives the quotient.

According to the present invention the rod 17 of the ratio slider is connected to a mechanical adding device, shown as being a double armed lever or summarizing member 18 pivotally connected to the rod 17 at 19, and displaceable by means of adjustment sliders 20 and 21. The adjustment sliders are provided with pointers 22 and 23 corresponding with logarithmically calibrated scales 24 and 25. The rod 17 will upon displacement of the adjustment sliders be moved by the arithmetic sum of the displacements. The sum of the displacements may be read by means of a pointer 26 and scale 27 of the rod 17. It is obvious that three and more logarithmic correction factors may be introduced in the same manner or by means of other adding devices well known in the art.

Figure 3:
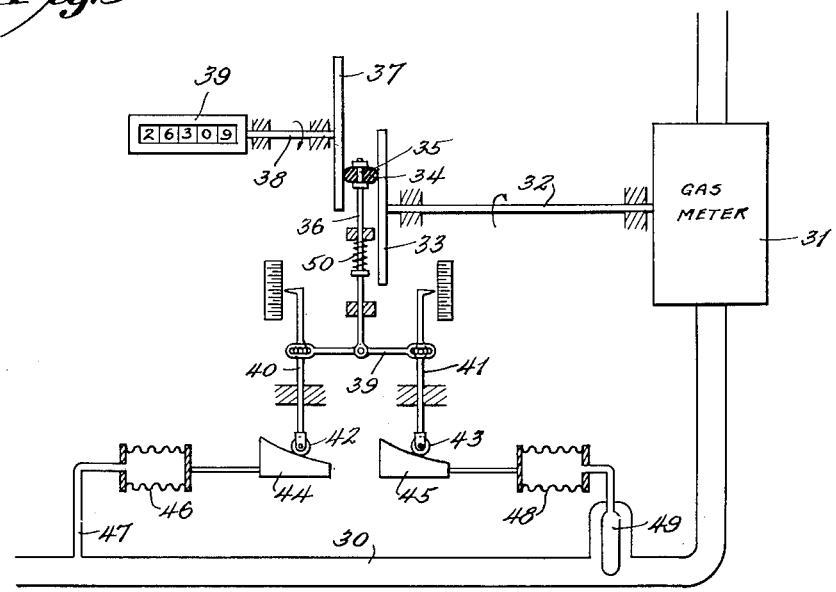
Figure 3 is a diagrammatic illustration of the invention as applied to a measuring device.

A device for automatically introducing two correction factors is shown in Figure 3 in which the invention is shown as applied to gas meters.

While the movement of the movable members, the levers 10 and 13 of Fig. 1 is restricted to relatively small deflections, the movable members of Fig. 3, the disks 33 and 37, may be regarded as levers having an unlimited range of movement, the lever axes being 32 and 38 and the effective lever arms the distances between the axes and the friction wheel.

A volumetric gas meter gives a correct reading only under normal temperature and pressure conditions. A rise in pressure above, or a drop in temperature below the normal value will allow a greater weight of gas to pass through the meter than is indicated by the same and vice versa. In other words, the weight of gas per volume unit may vary without affecting the reading of the meter.

Referring to Figure 3 a flow of gas carried by a conduit 30 passes through a volumetric meter 31. A rotating shaft 32 for operating the indicating mechanism of the meter is shown as extending from the meter. The shaft 32 carries a disk 33 driving a friction wheel or ratio slider 34 rotatably mounted at 35 on an axially movable shaft 36. The friction wheel, in turn, moves a second disk 37 on a shaft 38 operating the indicating mechanism of the meter shown as a revolution indicator 39 reading in terms of standard conditions. As shown in Fig. 3 the two shafts 32 and 38 are spaced from and parallel to each other. The shaft 36 is pivotally connected to a double armed lever or summarizing member 39' which is movable by stems 40 and 41 shown as provided with rollers 42 and 43 bearing against cams 44 and 45. The cam 44 is movable by means of a pressure responsive device shown as a bellows 46 communicating with the conduit 30 through a pipe 47. The second cam is movable by a temperature responsive device shown as a bellows 48 communicating with a thermostatic bulb 49 containing a fluid which expands and contracts in response to changes in temperature of the gas in the conduit 30. A compression spring 50 tends to maintain the rollers 42 and 43 in contact with the respective cams.

The operation of the device is as follows: Upon an increase in pressure of the gas to be measured the bellows 46 will move the cam 44 to the right, thereby moving the shaft 36 with the friction wheel upwardly and increasing the speed-ratio between the meter shaft 32 and the indicator shaft 38. An increase in temperature causes the bellows 48 to move the shaft 36 and friction wheel 34 downwardly, thereby diminishing the speed-ratio between the shafts 32 and 38. The indication of the counter 39 is therefore automatically corrected in response to changes in temperature and pressure of the gas, or, in other words, in response to changes in density of the gas, which is expressed as the ratio of absolute pressure to absolute temperature.

Figure 4:
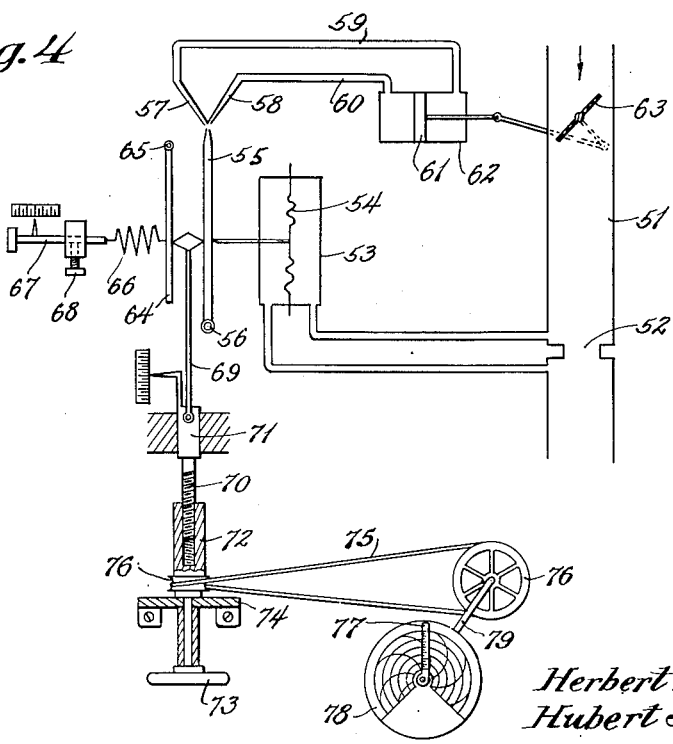
Figure 4 is a diagrammatic illustration of the invention as applied to a regulating device.

The means for displacing the ratio varying device, or ratio slider, may assume various forms. A preferred and very simple form is diagrammatically shown in Figure 4 in connection with a device for regulating a constant weight flow of gas.

Figure 5:
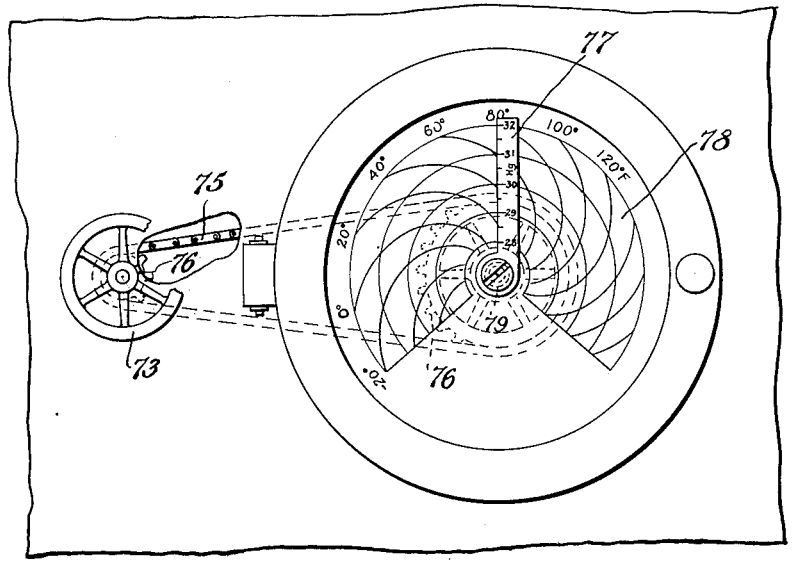
Figure 5 is the dial and pointer of the setting device of Figure 4 in larger scale.

A gas conduit 51 is equipped with a flow-responsive device shown as being a constriction 52 and a diaphragm casing 53 containing a diaphragm 54 acted upon by the differential pressure across the constriction 52. The diaphragm 54 controls a relay shown as being of the well known "Askania" jet-pipe type. A jet-pipe 55 is pivotally mounted about an axis 56 and supplied with pressure fluid from a suitable source (not shown). The fluid jet emerging from the jet-pipe nozzle enters receiving orifices 57 and 58 depending upon the relative position of the nozzle and the orifices, thereby setting up a differential pressure in the pipes 59 and 60 leading to opposite sides of a servo-motor piston 61 movable in a cylinder 62 and connected to operate a flow varying device shown as being a butterfly valve 63. A ratio lever 64 is pivotally mounted about an axis 65 being spaced from and parallel to the axis 56 of a jet-pipe 55. The ratio lever 64 is acted upon by a force acting in opposition to the controlling force and shown as being a spring 66 adjustable by means of a stem 67 held in place by a set-screw 68. The ratio slider 69 is movable by means of a threaded shaft 70 having a head 71 of suitable cross section to prevent the same from turning. The threaded shaft engages a nut or summarizing member 72 rotatable by means of a hand wheel 73. A bearing 74 prevents the nut from moving axially. The nut is also connected to operate an indicating device by any suitable means, such as a belt or sprocket chain 75 trained on a pair of pulleys or sprockets 76 to rotate a graduated arm or pointer 77 relative to a scale or dial 78. In this instance, the pointer is removably and adjustably secured to the end of an indicator shaft 79 operated by said pulleys or sprockets. The dial and pointer are shown on an enlarged scale in Fig. 5. The dial 78 carries a plurality of curves representing temperature degrees; while the pointer 77 is calibrated in terms of pressure. In the position shown, the device is set for a temperature of 60° F. at a pressure of 30.9 inches of mercury column. The calibrations and the arrangement are such that the nut 72 moves the shaft 69 by an amount representing the sum of the logarithms of the temperature and pressure correction factors.

The operation of the controlling device is as follows: The jet-pipe relay tends to maintain a constant differential pressure across the constriction 52 and thereby a constant flow through the conduit 51 by operating the valve 63. Upon an increase of flow, the flow responsive device will move the jet-pipe to the left, thereby causing the servo-motor 61, 62 to move the valve 63 towards its closed position. The magnitude of the differential pressure is determined by the adjustment of the restoring spring 66. Upon a change of density of the gas caused by a change in temperature or pressure, the position of the ratio slider is adjusted by means of the hand wheel 73 for the new temperature and pressure values whereby the controlling device permits a corrected volume of gas per time unit to pass through the conduit and the constant weight flow per time unit is maintained.

Figure 6:
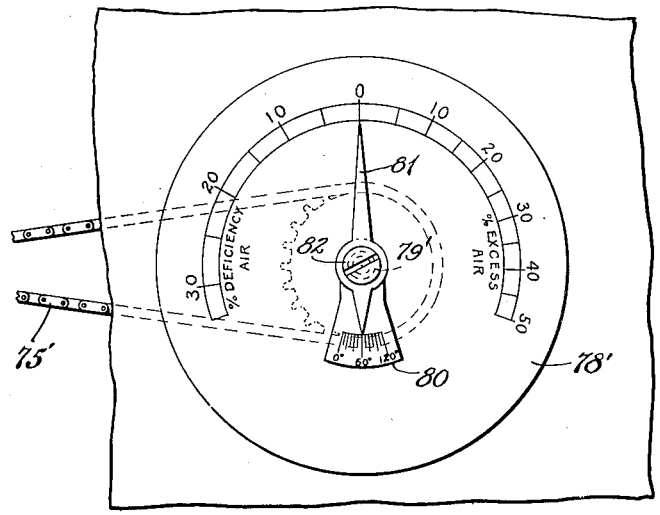
Figure 6 is a modified form of the dial and pointer.

A different form of indicating device, more particularly for use in a combustion regulator, is shown in Fig. 6. The purpose of a combustion regulator is to supply a furnace with a constant amount of combustion air per quantity unit of fuel. Since the density of the air changes with the temperature a correction is introduced into the regulator to compensate for temperature changes and maintain a constant weight of air per quantity unit of the fuel in a predeterminable ratio. It may be assumed that the supply of fuel is independently maintained constant. The stationary dial 78' is calibrated in terms of ratio of air to fuel. The chain drive 75 moves an indicator shaft 79' carrying a small dial 80 which is secured thereto. A double pointer 81 is adjustable with respect to the small temperature dial 80 by means of a screw 82 and its long hand coacts with the large dial 78'. It may be assumed as an example that the regulator should be set for 120° F. and 10% excess. Starting with the pointer 81 on 60° F. as shown in Fig. 6, the hand wheel 73 (see Figs. 4 and 5) will be turned until the pointer reaches 10% excess indicated by the dial 78' having a logarithmic graduation. Upon this turning movement the pointer 81 will not be displaced relatively to the small dial 80 having likewise a logarithmic graduation. After this first adjustment in accordance with the logarithm of one of the correction factors the pointer 81 will be disconnected from the shaft 79' by loosening of screw 82 and the pointer will be turned counter-clockwise from 60° to 120° F. and fastened again to the shaft. By this second displacement the pointer will also be displaced relatively to the stationary dial 78' so that the pointer will not show any longer 10% but less. Therefore, a second turning movement of the pointer and of the shaft is to be added in accordance with the logarithm of a second correction factor which will bring the pointer back to 10% excess.

From the foregoing, it follows that the slider 69 (see Fig. 4) will be displaced by a movement which is proportional to the sum of the logarithms of a plurality of correction factors, one of these factors being the temperature indicated by the small dial 80 and the other correction factor being the fuel air ratio or the excess indicated by the dial 78'. The construction of the regulator may in all other respects be identical with the one shown in Fig. 4. The stationary dial 78' is provided with a logarithmic graduation. Likewise the small dial 80 carries a logarithmic graduation so that by adjusting the pointer 81 with respect to the small dial 80 and to the stationary dial 78' by means of the hand wheel 73 (see Figs. 4 and 5) the ratio slider 69 will be displaced in proportion to the algebraic sum of the logarithms of the two correction factors represented by the dials 78' and 80.

The present invention is not restricted to the particular embodiments thereof herein shown and described. Moreover, it is not indispensable that all the features of the invention be used conjointly, since they may be employed advantageously in various combinations and sub-combinations.

What is claimed is:

1. In a mechanical movement device of the class described having a pair of movable members, said members being mounted to move about parallel axes, and having oppositely directed portions, a single ratio slider engaging the oppositely directed portions of said members to vary the movement of one member relative to the other member, a summarizing member connected to said slider for displacing it relative to said movable members, and separate means for adjusting said summarizing member relative to a plurality of correction factors by an amount which is proportional to the algebraic sum of the logarithms of the correction factors to thereby vary the ratio of the movements of said movable members by an amount which, expressed as a function of the movement of said slider, approximates an exponential value of the movement of said slider.

2. In a mechanical movement device of the class described having a pair of relatively movable lever members each pivoted at one end, said members being mounted to move about parallel axes, and having oppositely directed portions, a single ratio slider engaging the oppositely directed portions of said members to vary the movement of one member relative to the other member, a summarizing member connected to said slider for displacing it relative to said movable members, and separate means for adjusting said summarizing member relative to a plurality of correction factors by an amount which is proportional to the algebraic sum of the logarithms of the correction factors to thereby vary the ratio of the movements of said movable members by an amount which, expressed as a function of the movement of said slider, approximates an exponential value of the movement of said slider.

3. A mechanical movement according to claim 1, in which the movable members consist of a pair of lever members pivoted about spaced parallel axes of which the axis of one lever is opposite the axis of the other lever.

4. A mechanical movement according to claim 1, in which the movable members are in the form of a pair of spaced and parallel disks rotatable on axes which are parallel to each other, and in which the ratio slider includes a friction wheel engaging both side faces of and arranged in the space between the disks.

5. A mechanical movement according to claim 1, in which the movable members consist of a pivoted lever and a jet pipe pivoted at one end, said lever and jet pipe being spaced from each other and between which the slider operates and the pivot points of the lever and jet pipe being in opposite relationship.

6. A mechanical movement for the purpose described comprising at least two movable members spaced from each other, said members being mounted to move about parallel axes, and having oppositely directed portions, a bridging member in constant contact with the oppositely directed portions of, and slidable in the space between, the two movable members; a summarizing member connected to said bridging member for displacing it between said movable members; and two separate means each independently operable relative to the other for adjusting said summarizing member relative to a plurality of correction factors by an amount which is proportional to the algebraic sum of the logarithms of the correction factors to thereby vary the ratio of the movements of said movable members by an amount which, expressed as a function of the movement of said slider, approximates an exponental value of the movement of said slider.

HERBERT ZIEBOLZ.
HUBERT J. VELTEN.